(12) United States Patent
Maurer et al.

(10) Patent No.: US 7,807,726 B2
(45) Date of Patent: Oct. 5, 2010

(54) RECOVERY OF FLUORINATED SURFACTANTS FROM A BASIC ANION EXCHANGE RESIN HAVING QUATERNARY AMMONIUM GROUPS

(75) Inventors: Andreas Maurer, Altoetting (DE); Klaus Hintzer, Kastl (DE); Werner Schwertfeger, Altoetting (DE); Egon Obermaier, Taubenbach (DE); Astrid Weber, Garching (DE)

(73) Assignee: 3M Innovative Properties Company, St. Paul, MN (US)

( * ) Notice: Subject to any disclaimer, the term of this patent is extended or adjusted under 35 U.S.C. 154(b) by 918 days.

(21) Appl. No.: 11/373,430

(22) Filed: Mar. 10, 2006

(65) Prior Publication Data

US 2006/0205828 A1 Sep. 14, 2006

(30) Foreign Application Priority Data

Mar. 11, 2005 (EP) .................................. 05101921

(51) Int. Cl.
*C08J 5/20* (2006.01)
(52) U.S. Cl. .......................... 521/27; 523/310; 523/332; 562/605
(58) Field of Classification Search .................. 521/27; 523/310, 332; 562/605
See application file for complete search history.

(56) References Cited

U.S. PATENT DOCUMENTS

| | | | |
|---|---|---|---|
| 3,709,795 A | 1/1973 | Singleton | |
| 3,818,074 A | 6/1974 | Ahlbrecht | |
| 3,833,626 A | 9/1974 | Ferse et al. | |
| 3,882,153 A | 5/1975 | Seki et al. | |
| 4,005,137 A | 1/1977 | Rudolph et al. | |
| 4,038,231 A | 7/1977 | Downer et al. | |
| 4,207,831 A | 6/1980 | Wald et al. | |
| 4,282,162 A | 8/1981 | Kuhls | |
| 4,391,940 A | 7/1983 | Kuhls et al. | |
| 4,396,266 A | 8/1983 | Goto | |
| 4,446,109 A | 5/1984 | Bakke | |
| 4,609,497 A | 9/1986 | Cope | |
| 4,639,337 A | 1/1987 | Cope et al. | |
| 4,639,497 A | 1/1987 | Knight et al. | |
| 4,730,082 A | 3/1988 | Amiet | |
| 4,751,027 A | 6/1988 | Von Werner et al. | |
| 4,866,740 A | 9/1989 | Iijima | |
| 4,879,407 A | 11/1989 | Amiet | |
| 4,927,962 A | 5/1990 | Aramaki et al. | |
| 5,187,905 A | 2/1993 | Pourtau et al. | |
| 5,229,480 A | 7/1993 | Uschold | |
| 5,442,097 A | 8/1995 | Obermeier et al. | |
| 5,498,680 A | 3/1996 | Abusleme et al. | |
| 5,591,877 A | 1/1997 | Obermeier et al. | |
| 5,688,884 A | 11/1997 | Baker et al. | |
| 5,700,859 A | 12/1997 | Ogura et al. | |
| 5,763,552 A | 6/1998 | Feiring et al. | |
| 5,804,650 A | 9/1998 | Tsuda et al. | |
| 5,895,799 A | 4/1999 | Wu et al. | |
| 5,897,683 A | 4/1999 | Unoki et al. | |
| 5,959,026 A | 9/1999 | Abusleme et al. | |
| 5,965,210 A | 10/1999 | Tada et al. | |
| 6,025,307 A | 2/2000 | Chittofrati et al. | |
| 6,103,843 A | 8/2000 | Abusleme et al. | |
| 6,126,849 A | 10/2000 | Yamana et al. | |
| 6,290,776 B1 | 9/2001 | Tada et al. | |
| 6,436,244 B1 * | 8/2002 | Fuhrer et al. | ................... 203/95 |
| 6,518,442 B1 | 2/2003 | Felix et al. | |
| 6,613,941 B1 | 9/2003 | Felix et al. | |
| 6,642,301 B2 | 11/2003 | White et al. | |
| 6,642,415 B1 | 11/2003 | Führer et al. | |
| 6,660,798 B1 | 12/2003 | Marchese et al. | |
| 6,720,437 B2 * | 4/2004 | Jones et al. | ................. 554/191 |
| 6,825,250 B2 * | 11/2004 | Epsch et al. | ................ 523/310 |
| 6,833,403 B1 | 12/2004 | Bladel et al. | |
| 2002/0151748 A1 | 10/2002 | Jones et al. | |
| 2005/0070633 A1 * | 3/2005 | Epsch et al. | ................ 523/310 |

FOREIGN PATENT DOCUMENTS

CA 559182 6/1958

(Continued)

OTHER PUBLICATIONS

Bystrov, G. A., et al., "Carbon Adsorption Post-Treatment of the Waste Waters Containing Perfluoroacids," *Plasticheskie Massy* No. 4 (1990) p. 75-80.

*Primary Examiner*—Peter D. Mulcahy
*Assistant Examiner*—Henry Hu
(74) *Attorney, Agent, or Firm*—Julie A. Lapos-Kuchar; Brian E. Szymanski

(57) ABSTRACT

The invention provides a method for recovery of a fluorinated anionic surfactant from a basic anion exchange resin having quaternary ammonium groups, the method comprising eluting the anion exchange resin with a composition comprising an ammonium salt and a water miscible organic solvent. The method according to the invention may provide one or more of the following advantages. For example, the method can be designed to allow for recovery of substantially all of the fluorinated surfactant from a basic anion exchange resin having quaternary ammonium groups. Also, the liquid used for recovering the surfactant from the anion exchange resin is a simple liquid that can be readily and cost effectively manufactured. Further the process may be carried out in a convenient and easy manner. Furthermore, the method generally does not require large amounts of the eluting composition.

8 Claims, No Drawings

FOREIGN PATENT DOCUMENTS

| | | |
|---|---|---|
| DE | 4318258 | 12/1994 |
| EP | 1069078 A2 * | 1/2001 |
| EP | 1700869 A1 * | 9/2006 |
| GB | 2108155 | 5/1983 |
| JP | 60-245774 | 12/1985 |
| JP | 61-207556 | 9/1986 |
| JP | 5340708 | 12/1993 |
| JP | 8337858 | 12/1996 |
| JP | 8337859 | 12/1996 |
| JP | 10226864 | 8/1998 |
| KR | 2002-0038070 | 5/2002 |
| SU | 0910599 | 3/1982 |
| WO | WO 93/18198 | 9/1993 |
| WO | WO 95/00469 | 1/1995 |
| WO | WO 00/71590 | 11/2000 |

* cited by examiner

RECOVERY OF FLUORINATED SURFACTANTS FROM A BASIC ANION EXCHANGE RESIN HAVING QUATERNARY AMMONIUM GROUPS

CROSS-REFERENCE TO RELATED APPLICATION

This U.S. patent application claims priority to European Patent Application serial number 05101921.4, filed on Mar. 11, 2005, herein incorporated by reference in its entirety.

FIELD OF THE INVENTION

The present invention relates to recovery of an anionic fluorinated surfactant from a basic anion exchange resin having quaternary ammonium groups.

BACKGROUND

Anionic fluorinated surfactants are commonly used in the emulsion polymerization of fluorinated monomers to produce fluoropolymers. The resulting fluoropolymer dispersions may be coagulated so as to recover the fluoropolymer therefrom and sell the fluoropolymer in its solid form or the fluoropolymer dispersions can be, optionally after upconcentration, be sold as such. The fluorinated surfactants used are generally expensive. Furthermore, frequently used anionic fluorinated surfactants are perfluoroalkanoic acids and salts thereof. These surfactants may be environmentally undesirable in aqueous dispersions and/or waste water streams. Hence, it is desirable to recover the fluorinated surfactants from the dispersions and waste water streams.

Anion exchange resins have been used in the art to recover fluorinated surfactants from waste water streams generated during the manufacturing of fluoropolymers as well as to recover fluorinated surfactants from fluoropolymer dispersions. For example, WO 00/35971 describes the use of an anion exchange resin to recover a fluorinated surfactant from a fluoropolymer dispersion. WO 99/62830 and WO 99/62858 describe the use of an anion exchange resin to recover fluorinated surfactants from waste water streams.

Strongly basic anion exchange resins, which typically have quaternary ammonium groups, are known to be the most effective in the recovery of fluorinated surfactants. Unfortunately, it has also been found difficult to elute and thus recover the fluorinated surfactant from a strong basic anion exchange resin. U.S. Pat. No. 6,642,415 discloses that the elution with solutions of 1 mol/liter each of $NH_3$, NaOH and KF of a strongly basic anion exchanger resin that is charged to breakdown with the ammonium perfluorooctanoic acid (APFOA) yields APFOA concentrations in the range of only 0.1 mmol/liter (40 ppm) in the eluate. Consequently, such method for recovering APFOA from larger volumes of aqueous effluent is not economically feasible. U.S. Pat. No. 6,642,415 recommends the use of a weakly or moderately strong anion exchange resin and to elute such resin with an ammonia containing organic solvent optionally in the presence of alkali hydroxides.

U.S. Pat. No. 3,882,153 discloses the use of an aqueous $NH_3$ solution for the recovery of an anionic fluorinated surfactant loaded on a weakly basic anion exchange resin. It is demonstrated in the examples of this US patent that while an elution with an aqueous ammonia solution is highly effective for eluting a weakly basic anion exchange resin, the process is ineffective for eluting a strongly basic anion exchange resin.

EP 14431 discloses a method in which the fluorinated surfactant is recovered from basic anion exchange resins using a solution of a mineral acid in an organic solvent. However, only about 70% of the fluorinated surfactant is recovered from a strongly basic anion exchange resin. Further in the method of the EP application, the surfactant is converted into its methyl ester during the recovery.

SUMMARY

It would now be desirable to find a further method for eluting (or recovering) an anionic fluorinated surfactant from a basic anion exchange resin having quaternary ammonium groups. In particular it would be desirable to find an improved elution process for example being improved in the amount of fluorinated surfactant that can be recovered or minimizing the amount of eluting liquid needed to recover the fluorinated surfactant. It would further be desirable to find a process that is economically feasible, easy and convenient or a process that uses a simple low cost eluant to recover the fluorinated surfactant.

In accordance with one aspect of the invention there is provided a method for recovery of a fluorinated anionic surfactant from a basic anion exchange resin having quaternary ammonium groups, the method comprising eluting the anion exchange resin with a composition comprising an ammonium salt and a water miscible organic solvent.

The method according to the invention may provide one or more of the following advantages. For example, the method can be designed to allow for recovery of substantially all of the fluorinated surfactant from a basic anion exchange resin having quaternary ammonium groups. Also, the liquid used for recovering the surfactant from the anion exchange resin is a simple liquid that can be readily and cost effectively manufactured. Further the process may be carried out in a convenient and easy manner. Furthermore, the method generally does not require large amounts of the eluting composition.

The method according to the present invention may be used to recover an anionic fluorinated surfactant from a basic anion exchange resin having quaternary ammonium groups following adsorption thereon from an aqueous composition that contained the fluorinated surfactant. Such aqueous composition can be for example a waste stream of the fluoropolymer production or a fluoropolymer dispersion containing the fluorinated surfactant. Accordingly, in a further aspect, the present invention provides a method of recovery of a fluorinated anionic surfactant from an aqueous composition comprising said fluorinated anionic surfactant, the method comprising (i) contacting a basic anion exchange resin having quaternary ammonium groups with said aqueous composition, (ii) separating said anion exchange resin from said aqueous composition and (iii) eluting the obtained anion exchange resin according to a method as defined above.

The anionic fluorinated surfactant following recovery from the anion exchange resin may be used, optionally after further purification, in emulsion polymerization of a fluorinated monomer to produce a fluoropolymer. Accordingly, in a still further aspect, the present invention provides a method of making a fluoropolymer by providing an anionic fluorinated surfactant using the recovery method as defined above and polymerizing one or more fluorinated monomers in an aqueous emulsion polymerization in the presence of said anionic fluorinated surfactant.

DETAILED DESCRIPTION

The composition used for eluting the anion exchange resin and to recover the fluorinated surfactant there from comprises an ammonium salt and a water miscible organic solvent. Ammonium salts for use in connection with the present invention include organic as well as inorganic salts. Generally, the ammonium salt will be an inorganic ammonium salt. In an alternative embodiment, the ammonium salt may be an organic ammonium salt, in particular one in which the anion of the salt is organic such as for example a carboxylic anion.

According to a particular embodiment of the invention, the ammonium salt is one that corresponds to the general formula:

$$(NH_4)_n X$$

wherein X represents an anion other than OH⁻ and n equals the valence of X. Examples of anions X include inorganic as well as organic anions. Particular examples of inorganic anions include halogen or halogen containing inorganic anions such as for example $F^-$, $Cl^-$, $Br^-$, $I^-$, $ClO_4^-$, phosphates, sulfates, sulphonates, carbonates including $HCO_3^-$ and $CO_3^{2-}$. Examples of organic anions include in particular carboxylic anions such as for example $HCOO^-$ and $CH_3COO^-$.

The appropriate amount of ammonium salt in the composition used for recovering the fluorinated surfactant can be readily determined by one skilled in the art through routine experimentation. The amount will generally depend on the nature of the anion exchange resin and the amount of fluorinated surfactant adsorbed on the anion exchange resin and/or the percentage of recovery that is desired. A suitable amount of ammonium salt is generally at least 0.1% by weight. According to a particular embodiment, the amount of ammonium salt is between 0.1 and 5% by weight based on the total weight of the composition used for eluting the exchange resin. In another embodiment, in amount of ammonium salt between 1 and 3% by weight may be used. The amounts of ammonium salt recited merely serve as guidance and are not intended to exclude the use of amounts of ammonium salt outside the range stated. For example, amounts of ammonium salt of less than 0.1% by weight or more than 5% by weight may be suitable in particular circumstances.

The eluting composition further includes a water-miscible solvent. By 'water miscible solvent' is generally meant an organic solvent that has solubility in water of at least 5% by weight, for example at least 10% by weight or at least 20% by weight. Suitable water-miscible solvents are typically polar solvents including for example alcohols, ketones, ethers and mixtures thereof. Particular examples of solvents include lower alkanols having between 1 and 6 carbon atoms such as for example methanol, ethanol and propanol; glycols, mono- and dialkyl ethers or monoglycol and diglycol wherein the alkyl groups have between 1 and 4 carbon atoms; ketones such as acetone and methyl ethyl ketone. The amount of water miscible organic may vary widely but should generally be enough to dissolve the ammonium salt. According to an embodiment of the invention, the amount of water-miscible organic solvent is at least 50% by weight of the total weight of the eluting composition. Exemplary ranges are 50 to 99.9% by weight, or between 60 and 90% by weight or between 90 and 98% by weight.

The eluting composition may contain further components that may aid in the recovery of the fluorinated surfactant from the anion exchange resin. In one particular embodiment, the eluting composition further comprises water. Water may for example be used in the eluting composition in an amount of up to 45% by weight, for example in an amount of 0.1 to 40% by weight or in amount between 1 and 15% by weight or in an amount between 4 and 10% by weight.

A further component that may be present in the eluting composition is a base. Suitable bases that may be used are alkali metal hydroxides such as for example sodium hydroxide and potassium hydroxide. Other bases that may be used include earth alkali metal hydroxides, aluminium hydroxide or alcolates such as for example sodium methylate. When present, the amount of base included in the composition is generally up to about 5% by weight. An exemplary range is from 0.1 to 5% or from 0.5 to 2% by weight.

The basic anion exchange resin having quaternary ammonium groups loaded with fluorinated surfactant may be eluted with the eluting composition described above by contacting the eluting mixture with the load anion exchange resin. Typically, the elution is carried out by pumping the eluting mixture over the loaded exchange resin held in a column. Upon exiting the column, the eluate will contain fluorinated surfactant. The fluorinated surfactant may then be recovered from this eluate by suitable separation methods such as distillation, extraction or crystallization. Alternatively, the exchange resin may be treated with the eluting composition by gently stirring the anion exchange resin with the eluting mixture followed by separating the anion exchange resin from the eluting composition e.g. by filtration. The amount of eluting composition that is needed to recover fluorinated surfactant from the anion exchange resin depends on the amount and nature of the fluorinated surfactant that is adsorbed on the anion exchange resin as well as on the composition of the eluting composition. It has been found that generally a composition comprising as an ammonium salt, ammonium chloride, is highly effective.

The method is typically practiced at room temperature, e.g. at a temperature of 15 to 30° C. However, the method may also be carried out at a higher temperature for example at a temperature between 30 and 80° C. The elution of the fluorinated surfactant may be somewhat more efficient at such higher temperature although an elution at higher temperature may increase costs for the recovery. It will generally also be desirable to condition the loaded anion exchange resin by first washing the resin with water followed by a water/organic solvent mixture and finally with the pure organic solvent. Although not necessary for the practice of the method of this invention, such conditioning may prevent damaging the exchange resin in the elution method.

The method of the present invention may be used to recover a variety of fluorinated surfactants from a basic anion exchange resin having quaternary ammonium groups. Examples of anion fluorinated surfactants that may be used include perfluoropolyether surfactants that have an anionic group such as for example a carboxylic acid group and perfluoroalkanes having an acid group and salts thereof. The method of the present invention is particularly suitable for the recovery of perfluoroalkanoic acids and salts thereof such as perfluoro-octanoic acid and salts thereof. The latter surfactant is widely used in the fluoropolymer industry and is a surfactant belonging to the general class of surfactants that may be represented by the following general formula:

$$(Y-R_f-Z)_j-M \qquad (I)$$

wherein Y represents hydrogen, Cl or F; $R_f$ represents a linear or branched perfluorinated alkylene having 4 to 10 carbon atoms; Z represents $COO^-$ or $SO_3^-$; M represents a cation including monovalent and multivalent cations, e.g. an alkali metal ion, an ammonium ion or a calcium ion and j corresponds to the valence of M and typically has a value of 1, 2 or 3.

As mentioned above, the fluorinated surfactant that is contained in the eluate may be separated therefrom using an appropriate separation method. In a particular embodiment, when the fluorinated surfactant is one that in its free acid form is steam-volatile may be readily separated from the eluate by acidifying the eluate so as to put the fluorinated surfactant in its free acid form and subsequently distilling the eluate to recover the fluorinated surfactant in its free acid form. If desired, the recovered fluorinated surfactant may be converted into a suitable salt. For example by collecting the distilled fluorinated surfactant in an ammonium solution, the ammonium salt of the fluorinated surfactant may be obtained. Generally, the surfactants according to formula (I) and in particular the perfluoro-octanoic acid is steam volatile and may be recovered using the above described method. It may be desirable to remove the organic solvent(s) used from the eluate prior to converting the surfactant in its free acid form. Thus, the organic solvent may first be removed by distillation and subsequently the remaining mixture may be acidified to convert the fluorinated surfactant in its free acid form followed by distilling of the fluorinated surfactant.

The fluorinated surfactant that is recovered in this way can be re-used in an aqueous emulsion polymerization of one or more fluorinated monomers according to the procedures known for aqueous emulsion polymerization of fluorinated monomers. Examples of fluorinated monomers that may be emulsion polymerized using the recovered surfactant include gaseous fluorinated monomers including partially and fully fluorinated gaseous monomers such as fluorinated olefins including tetrafluoroethylene, hexafluoropropylene, vinylidene fluoride, vinyl fluoride, fluorinated vinyl ethers and in particular perfluorinated vinyl ethers such as perfluoromethylvinyl ether. The fluorinated monomers may be copolymerized with further monomers, which may not be fluorinated such as for example olefins such as ethylene and propylene.

The basic anion exchange resin having quaternary ammonium groups loaded or charged with an anionic fluorinated surfactant may result from any of a variety of fluorinated surfactant removal processes. For example, the loaded anion exchange resin may result from contacting an aqueous composition comprising anionic fluorinated surfactant. Such aqueous composition may be a waste water stream that has been contaminated with the fluorinated surfactant during a manufacturing process in the manufacturing of a fluoropolymer. For example, such waste water may result from an upconcentration method, ultrafiltration method or washing process. Alternatively, the anion exchange resin may be charged with fluorinated surfactant by contacting a fluoropolymer dispersion containing the fluorinated surfactant with the basic anion exchange resin having quaternary ammonium groups.

The invention is further illustrated with reference to the following examples without however the intention to limit the invention thereto.

EXAMPLES

Test Method

The amount of APFO in the eluate was determined by conversion of the APFO into the methyl ester followed by an analysis with gas chromatography using an internal standard the methyl ester of perfluorodecanoic acid. The detection limit here was 1 ppm.

The effectiveness of an elution mixture was measured by determining the concentration of APFO in the eluate after a certain volume of the elution mixture had flown through the ion exchanger column. The column used had a length of 30 cm and a diameter of 6.5 cm and was filled with 350 ml of the commercially available anion exchanger resin AMBERLITE IRA 402 which is an exchange resin having quaternary ammonium groups.

Comparative Examples 1 to 7

The resin was charged with an aqueous ammonium perfluorooctanoate (APFOA) solution until 85% of the theoretical capacity of the ion exchange resin was loaded. The resin was then washed with one bedvolume of deionized water and one bedvolume of water/methanol 1:1 mixture and one bedvolume pure methanol. Following this conditioning step, the loaded anion exchange resin was eluted with the compositions described in tables 1 and 2.

Table 1 below shows the results for various aqueous ammonia compositions used for eluting the basic anion exchange resin having quaternary ammonium groups. The compositions given in table 1 are in % by weight.

TABLE 1

| Comp. Ex. | NaOH (%) | $NH_3$(%) | $H_2O$(%) | Methanol | BV/h | resin loaded | % of regeneration* |
|---|---|---|---|---|---|---|---|
| 1 | 5 | 0.85 | 24.15 | 70 | 0.5 | 85 | 45.0% after 12 BV |
| 2 | 5 | 0.85 | 44.15 | 50 | 0.5 | 85 | 7.3% after 12 BV |
| 3 | 5 | 2.5 | 42.5 | 50 | 0.5 | 85 | 8.3% after 12 BV |
| 4 | 10 | 0.85 | 39.15 | 50 | 0.5 | 85 | 19.8% after 12 BV |
| 5 | 5 | 1.7 | 23.3 | 70 | 0.5 | 85 | 39.1% after 12 BV |
| 6 | 3 | 1.7 | 25.3 | 70 | 0.5 | 85 | 14.8% after 12 BV |
| 7 | 3 | 5 | 22 | 70 | 0.5 | 85 | 18.9% after 12 BV |

*percentage of fluorinated surfactant recovered from the resin as determined with the above described test method.

The examples above show that a regeneration of basic anion exchange resin having quaternary ammonium groups is not very effective using ammonia-containing water/solvent (methanol) mixtures.

Examples 1 to 9

In examples 1 to 9, elution composition according to the invention were used instead of the elution mixtures used in comparative examples 1 to 7. The elution rate was varied to show that faster rates are possible without loosing efficiency. The regeneration is therefore much less time consuming.

Table 2 summarizes the results for different compositions. The composition are given in percent by weight.

TABLE 2

| Ex. | $NH_4X$ (%)* | NaOH (%) | $H_2O$ | Methanol | BV/h | resin loaded | % of regeneration** |
|---|---|---|---|---|---|---|---|
| 1 | 2.4 | — | — | 97.6 | 3 | 100 | quantitative after 6 BV |
| 2 | 1.8 | — | — | 98.2 | 3 | 100 | quantitative after 7 BV |
| 4 | 2.4 | — | 10 | 87.6 | 3 | 100 | quantitative after 6 BV |
| 5 | 2.4 | — | 5 | 92.6 | 3 | 100 | quantitative after 6 BV |
| 7 | 2.4 | 0.05 | — | 97.1 | 3 | 35 | quantitative after 6 BV |
| 8 | 2.4 | — | — | 100 | 0.5 | 35 | >70% after 7 BV |
| 9 | 4.5 | — | — | 100 | 3 | 100 | >75% after 7 BV |

*Examples 1 to 7: X = Cl; Example 8: X = F; Examples 9: $NH_4X = (NH_4)_2CO_3$
**percentage of fluorinated surfactant recovered from the resin as determined with the above described test method.

What is claimed is:

1. Method for recovery of an anionic fluorinated surfactant from a basic anion exchange resin having quaternary ammonium groups, the method comprising eluting an anion exchange resin having quaternary ammonium groups and an anionic fluorinated surfactant with an aqueous composition comprising an ammonium salt and a water miscible organic solvent, wherein the ammonium salt corresponds to the formula:

$$(NH_4)_nX$$

wherein X represents an anion other than $OH^-$ and n equals the valence of X.

2. Method according to claim 1 wherein the anion is selected from the group consisting of $F^-$, $Cl^-$, $Br^-$, $I^-$, carboxylic anions, sulfate anions and sulfonate anions.

3. Method according to claim 1 wherein the amount of ammonium salt is between 0.1 and 5% by weight of the aqueous composition.

4. Method according to claim 1 wherein the amount of water miscible organic solvent is at least 50% by weight.

5. Method according to claim 1 wherein the composition further comprises a base.

6. Method according to claim 1 wherein the anionic fluorinated surfactant is removed from the anion exchange resin.

7. Method of recovery of an anionic fluorinated surfactant from an aqueous composition which contains fluorinated anionic surfactant, the method comprising (i) contacting a basic anion exchange resin having quaternary ammonium groups with the aqueous composition, (ii) separating the anion exchange resin from the aqueous composition and (iii) eluting the obtained anion exchange resin according to a method as defined in claim 1.

8. Method according to claim 1 wherein at least 70% by weight of the anionic fluorinated surfactant is recovered using seven bed volumes or less of the aqueous composition.

* * * * *